United States Patent Office 3,235,490
Patented Feb. 15, 1966

3,235,490
PROCESS FOR FLOCCULATING AND SETTLING SOLIDS SUSPENDED IN AN AQUEOUS MEDIUM AND COMPOSITION FOR USE THEREIN
Mayer B. Goren, Golden, Colo., assignor to Kerr-McGee Oil Industries, Incorporated, a corporation of Delaware
No Drawing. Continuation of application Ser. No. 543,263, Oct. 27, 1955. This application July 12, 1962, Ser. No. 209,290
20 Claims. (Cl. 210—52)

This application is a continuation of application Ser. No. 543,263, filed Oct. 27, 1955, now abandoned, which was in turn, a continuation-in-part of application Ser. No. 466,217, filed Nov. 1, 1954, now abandoned.

This invention relates to a new and improved process for separating solids suspended in aqueous media. More particularly, this invention employs certain specific agglomerating agents which have been discovered to possess excellent agglomerating characteristics in the treatment of, for example, leach liquors containing slimes or other suspensions of solids in aqueous media.

In ore processing by hydrometallurgical processes, wherein ground ores are subjected to aqueous leaching techniques with neutral, acid or alkaline solutions, the clay and shale fractions of the ores are subjected to mechanical attrition and hydration which results in the suspension of large quantities of highly hydrated small particles, referred to as "slimes." These particles resist settling under gravity or in centrifuges, and plug the pores of filter media when attempts are made to purify the leach liquors by the process of filtration. To aid settling or filtration processes, various natural and synthetic flocculants, which may be classified as polyelectrolytes, have enjoyed considerable use. Thus glue and the more expensive gelatin (polycationic materials) serve to agglomerate slimes more or less satisfactorily, and aid in the clarification or filtration of the solutions. These polycationic materials, as well as certain synthetic polycationic polyelectrolytes, such as polyvinyl pyrrolidone, polyacrylamide, poly-N-alkyl acrylamide, poly-N,N-dialkyl acrylamide, poly-dimethyl amino ethyl acrylate, poly-diethylamino ethyl acrylate, poly-dimethylamino ethyl methacrylate, poly-diethyl amino ethyl methacrylate, poly-2-vinyl pyridine, poly-4-vinyl pyridine, and copolymers of the individual monomers from which the above named substances are prepared, are likewise effective in flocculating clay and slime particles. As predicted from a consideration of the Hofmeister or lyotropic theories of colloidal agglomeration, the efficiency of these substances as flocculants increases with increasing molecular weight. Unfortunately these materials suffer from the limitation that the flocs which are produced, when slimes are treated with these substances, are tiny, and as a consequence are extremely slow to settle and offer considerable resistance to filtration.

Polyanionic materials such as sodium polyacrylate, certain starch fractions, the modified celluloses such as carboxymethyl cellulose, hydroxyethyl cellulose, methyl cellulose, hydroxyethyl carboxymethyl cellulose, and certain naturally occurring gums such as locust bean gum and guar gum enjoy use as flocculating agents in the treatment of clays and slime particles. These can be very effective as flocculants, although under certain circumstances, particularly when acid suspensions of slimes are encountered, these substances may be completely ineffective (e.g., sodium polyacrylate is rendered insoluble by acids) or will fail to agglomerate more than a fraction of the suspended particles, leaving in the main, turbid liquors which require further processing. Generally, when the rather unsatisfactory polycationic materials are used, further processing is required.

Accordingly, it is a principal object of this invention to provide a new and improved process for separating solids suspended in aqueous media.

It is a further important object of the present invention to provide a process employing newly discovered flocculating agents for agglomerating solids suspended in aqueous media and thereby enhance the filtration rate when separating solids from these aqueous media by filtration methods.

A further important object of the present invention is to provide a process employing newly discovered flocculating agents for agglomerating solids suspended in aqueous media and thereby enhance their separation rate when separating solids from these aqueous media by centrifuging methods.

A further important object of the present invention is to provide a process employing newly discovered flocculating agents for agglomerating solids suspended in aqueous media and thereby enhance their settling rate in thickening operations normally employed for separating the solids.

A further important object of the present invention is to provide a process employing newly discovered flocculating agents for agglomerating solids suspended in aqueous media having a considerable portion of the solids removed by a previous operation.

A further important object of the present invention is to provide a process employing newly discovered flocculating agents for agglomerating solids suspended in aqueous media wherein the flocculating agents may be used alone or in conjunction with other known flocculating agents.

These and other objects of the present invention will become more apparent after considering the following description of the present invention.

As disclosed in my copending application Serial No. 421,161 of April 5, 1954, now U.S. Patent 2,937,143, I have succeeded in improving to a very impressive extent the flocculating activity of the natural water soluble proteins such as are derived from collagen: e.g., gelatin and the less expensive glue fractions, through a combination of linear growth and crosslinking to the point of substantial gelling, by the use of formaldehyde, glyoxal, pyruvic aldehyde and other reactive agents. In accordance with the present invention I have now discovered that proper crosslinking of synthetic, organic, nitrogen-containing polyelectrolytes enhances their flocculating activity and agglomerating ability and that these so modified polyelectrolytes are characterized by a coagulating effect which gives rise to large, stable, curdy flocs which settle much more rapidly or filter more easily than those formed through the use of linear polyelectrolytes.

In accordance with the present invention properly crosslinked polycationic polyelectrolytes afford improved flocculating and agglomerating agents. For example, when polyvinyl pyrrolidone, a polyamide of the structure:

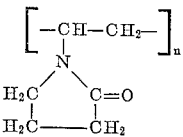

wherein $n$ is some large integer, is properly crosslinked, it is converted into a much more effective agglomerant than was the original starting material. Whereas a polyvinyl pyrrolidone fraction of fairly high molecular weight (viscosity of K–90) is a reasonably effective flocculant, yet it is little better than a good gelatin fraction. The flocs produced with a slime fraction, for example, are of the same size as those produced by gelatin; they settle slowly, and furthermore, when it is sought to increase the beneficial flocculating effect through the use of larger quantities of the material, this polyelectrolyte—like other substantially linear polycationic materials begins to behave as a suspending agent, which stabilizes and resuspends the previously flocced solids because of its detergent properties. On the other hand, when the polyvinyl pyrrolidone is crosslinked as described in the examples below, the flocculating action is vastly improved—the flocs produced are bigger, more stable, much more quick to settle and in addition, even large excesses of reagent do not serve to resuspend the flocced material, but rather serve to make the flocs bigger and coarser. The polyvinyl pyrrolidone which has been crosslinked to a state where it has lost its ability to resuspend solids could be said to have lost its detergency. In fact, when a sample of slimes is treated with an excess of the linear polyvinyl pyrrolidone (K–90) to the point where it is resuspended, the resuspended slimes can be effectively flocced and settled through the addition of small amounts of the crosslinked counterpart or through other crosslinked polyelectrolytes. This very impressively demonstrates the great effectiveness of the crosslinked polycationic materials as flocculants as compared with their linear counterparts.

In the ore processing practices described briefly above, it was pointed out that the leach liquors containing the desirable mineral constituents in solution must in general be separated from the suspended solids which they contain before they can be processed for recovery of the metal values. Conventional ore treating processes incorporate either a filtration and washing step or a counter current washing of the waste solids in large tanks or thickeners where sufficient residence time is allowed to effect substantial settling of the waste solids. The overflow liquors are advanced either to pregnant liquor storage or to wash more highly contaminated waste solids, while the underflow solids slurry is advanced for further washing and settling in as many stages as are needed to effect essentially complete removal of soluble values. It is common practice to separate to a large extent the larger, heavier fractions of solids (referred to as "sands") from the fine, more highly hydrated and poorly settling fractions (referred to as "slimes") in conventional washer-classifiers. The sands are advanced through successive washings to discard, while the slimes are sent to the washing-thickening circuit.

Examination of an acid slimes fraction in terms of its response to treatment with flocculating agents generally indicates that at least two types of slimes exist in the system. Thus, in general, all of the slimes can to a large extent be flocculated through the addition of a polycationic flocculant such as glue, gelatin, polyvinyl pyrrolidone, and the other synthetic materials above mentioned. When these flocculants are essentially linear and not crosslinked, tiny flocs are produced, which are slow to settle, although a clear liquor may be obtained. This situation cannot be tolerated in a thickening operation unless the thickeners are of very large dimensions. On the other hand, if an acid slimes mixture is treated with a polyanionic flocculant such as certain starches, modified cellulose products such as carboxymethyl cellulose (CMC), hydroxyethyl cellulose, methyl cellulose, hydroxyethyl carboxymethyl cellulose, or certain of the natural gums such as guar gum or locust bean gum, a certain fraction of the slimes will be agglomerated to afford fairly large flocs which settle relatively rapidly, but the remainder of the slimes are unaffected by the flocculant and remain in suspension. For purposes of discussion, the slimes which are flocced by polyanionic flocculants will be termed Type I, while those not affected by these flocculants will be termed Type II. The Type II slimes can subsequently be agglomerated by a polycationic agent to afford gelatinous flocs which settle slowly and compact very poorly. These flocs will pass through ordinary filter paper because they are so small and so unstable.

When a combination of polyanionic and linear polycationic materials is used, a clear overflow liquor can be obtained, but the rate of settling is considerably diminished as compared with the settling rates obtained with a polyanionic flocculant alone.

Very often there is a large preponderance of Type II slimes to be found in a leach pulp, with the result that the slimes cannot be readily flocced and settled. In addition, certain aging phenomena have been found to affect a reversal in amenability to floccing by gums or cellulose derivatives. Thus, a freshly prepared pulp may be fairly amenable to flocculation by anionic agents, but a small amount of aging may induce such alterations in the nature of the slimes' surface that the response to these agents is very poor.

For settling purposes, it would be highly desirable if a combination of polyanionic and polycationic flocculants could be used to effect total flocculation of suspended solids (Types I and II). However, as was pointed out above, addition of the ordinary polycationic agents markedly affects the nature of flocs produced by polyanionic agents, so that they no longer settle rapidly. However, when the crosslinked polycationic flocculants of the present invention are used in conjunction with polyanionic materials, a remarkably synergistic action is observed, the flocs produced by a combination of these reagents being larger and more rapidly settling than the flocs produced by the combination above described; the overflow liquors are considerably clearer than where either reagent is used alone, in fact, sparkling in many instances. The crosslinked polyelectrolytes of this invention can further be used to good advantage with glue, gelation or other polycationic materials. In general, the order of addition of reagents can be important, and it has been found that although a mixture of the reagents functions satisfactorily, if the reagents are added stepwise, with agitation, the most satisfactory results are obtained if the crosslinked polycationic material is added last.

The synergistic action is pronounced with the cellulose derivatives such as carboxymethyl cellulose, methyl cellulose, hydroxyethyl cellulose, and carboxymethyl hydroxyethyl cellulose; and similar results are obtained when some of the natural gums, such as guar gum, locust bean gum, or fractions of these gums, are employed with the reagents of the present invention. The overall effect is to produce massive flocs which settle rapidly to afford a supernatant liquor, which in many instances is of sparkling clarity. Furthermore, the underflow advance can be agitated relatively vigorously in the succeeding washing operations without incurring the resuspension of fine slimes, yet maintain high settling rates. Thus, in a thickener operation, it is possible to obtain an essentially clear overflow at all stages, so that no build-up of fine advanced slimes is incurred.

The use of crosslinked polycationics in admixture with glue, gelation or other essentially linear polycationic flocculants is similarly very advantageous in that the settling rate of the flocs is considerably enhanced over that obtainable from the use of the latter reagents alone. When a crosslinked polycationic agent of this invention is used with an essentially linear type it is generally most beneficial if the crosslinked material is added last.

The beneficial effect on filtration rates accruing from the use of mixtures of crosslinked polycationics with polyanionic flocculants, even on a pure slime suspension is quite pronounced. Use of the combination results in considerably increased filter rates and good cake pick-up.

Proper crosslinking of these polyelectrolyte substances can be carried out during the course of the polymerization reaction through the use of small quantities of diolefinic substances which copolymerize with the monomer to achieve this beneficial crosslinking effect. Thus any monomer which can be polymerized by itself to afford a water dispersible polyelectrolyte or which can after polymerization be hydrolyzed to afford a water-dispersible polyelectrolyte can be copolymerized with small amounts of diolefinic agents to achieve a satisfactory crosslinked product. The ratio of monoolefin to diolefin will in large measure determine the degree of crosslinking, and for each substance there is an optimum degree of crosslinking, beyond which the flocculating activity will decrease because the material becomes less and less dispersible in water. Crosslinking to the point of gelation is desirable, but if the gel will no longer swell readily in water, too high a degree of crosslinking has been achieved and the product is unsatisfactory.

In Table I are listed monomers which can be polymerized alone or copolymerized with each other to afford linear polyelectrolytes. In Table II are listed diolefinic or polyolefinic materials which may be used with the monomers in small amounts to achieve crosslinking, the degree of crosslinking depending upon the reactivity of the reagents and their relative proportions.

TABLE I

| | |
|---|---|
| N,N-diethyl amino ethyl acrylate | Acrylamide |
| N,N-diethyl amino ethyl methacrylate | 2-vinyl pyridine |
| N,N-dimethyl amino ethyl acrylate | 4-vinyl pyridine |
| N,N-dimethyl amino ethyl methacrylate | Methyl vinyl pyridine |
| N-methyl acrylamide | Ethyl vinyl pyridine |
| N,N-dimethyl acrylamide | N-vinyl pyrrolidone |

TABLE II

| | |
|---|---|
| Allyl acrylate | Diallyl oxalate |
| Allyl methacrylate | Diallyl succinate |
| N,N-diallyl acrylamide | Diethylene glycol divinyl ether |
| Diallyl amine | Ethylene diacrylate |
| Diallyl diglycolate | Glyceryl trimethacrylate |
| Diallyl fumarate | Glyceryl triacrylate |
| Diallyl itaconate | Methallyl acrylate |
| Diallyl maleate | N,N-methylene-bisacrylamide |
| Diallyl malonate | Triallyl aconitrate |
| Diallyl melamine | Triallyl cyanurate |
| N,N-diallyl methacrylamide | Vinyl acrylate |
| Vinyl methacrylate | Vinyl acrylate |

Crosslinking may be achieved in certain polycationic materials in other ways. Thus, for example, polyelectrolytes containing amino or amino groups bearing at least one hydrogen linked to the nitrogen atom, can be effectively crosslinked with aldehydic reagents such as formaldehyde, glyoxal, and pyruvic aldehyde. This has been effectively demonstrated with the natural protein products as described in my copending application Serial No. 421,161, and I have extended these crosslinking reactions involving carbonyl condensation to simpler systems such as polyacrylamide.

Polyvinyl pyrrolidone, bearing no hydrogen in the amide group, cannot be crosslinked with aldehydic reagents, but instead lends itself to a third type of crosslinking reaction based on the formation of new carbon to nitrogen bonds between adjacent chains of linear molecules. Thus, when a polyvinyl pyrrolidone (preferably of fairly high molecular weight) is treated with alkali under certain conditions, hydrolysis of some amide groups within the chain occurs, and subsequently some new amide linkages are formed between adjacent molecules to afford crosslinks; vis:

(1) Partial hydrolysis of the amide linkages along the chain:

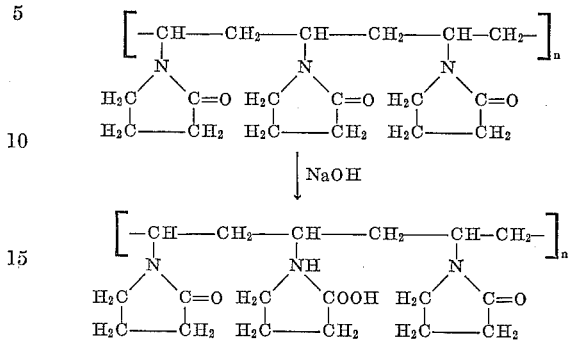

(2) Crosslinking of adjacent chains by formation of new carbon nitrogen linkages to produce the structure:

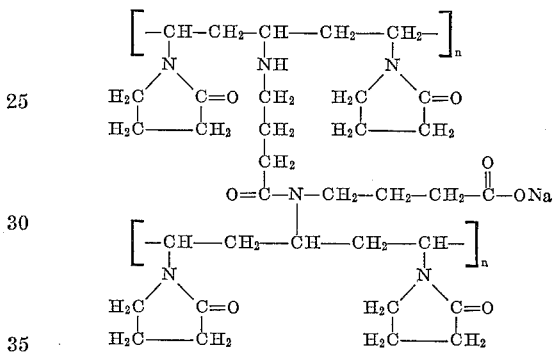

or possibly the structure:

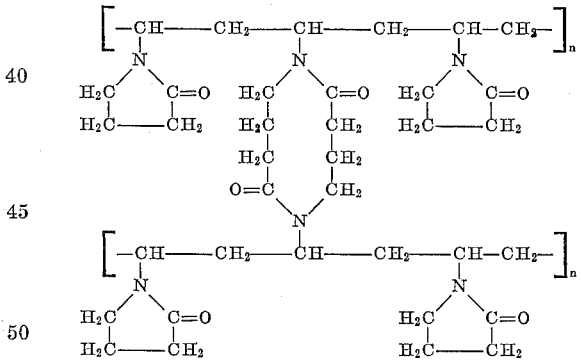

Not all conditions of treatment with alkali will give rise to the desirable crosslinked properties, and acid hydrolysis does not appear to be as effective as the optimum alkaline treatment. A feature of the alkyline hydrolysis and crosslinking process which became apparent after numerous reaction conditions were investigated is that the reaction is relatively unsuccessful unless the polyvinyl pyrrolidone is essentially forced out of solution by a combination of proper alkali concentration and proper temperature. In a solution dilute enough to maintain homogeneity throughout the reaction time, almost no improvement in fluocculating activity results. On the other hand, if the concentration of alkali is too great, too much crosslinking will occur and the resultant gel which is forced out of solution will no longer swell in water, is not readily dispersible, and loses most of its activity as a fluocculant. A crosslinked polyelectrolyte of this species having improved agglomerating activity, I prefer to call one obtained by a controlled non-homogeneous hydrolysis reaction.

As a variant of the last described process, crosslinks can be induced into polymeric amide systems during the course of the linear polymerization by operating under such conditions that partial hydrolysis occurs along the amide chains with subsequent formation of imide linkages serving to connect two or more chains together through these imide linkages as in the instance of polyvinyl pyrrolidone under the influence of alkali. Thus, it has been found for example that if acrylamide is polymerized in concentrated aqueous solution at elevated temperatures, a relatively insoluble, tough crosslinked product is produced which swells very slowly in water and disperses only after several days.

As will be evident from the foregoing discussion of the agents of the present invention and as illustrated by examples appearing hereinafter, crosslinked synthetic, organic, nitrogen-containing polyelectrolytes exhibit an enhanced fluocculating activity and agglomerating ability providing the degree of crosslinking is properly controlled. The proper degree of crosslinking may best be defined by stating that it is such that the resulting polymer is still readily water swellable and dispensible. In particular, a small amount of crosslinking to the point of even slight gelation and partial insolubility in water, is highly beneficial to the behavior of these agents. Thus the agents of the present invention may properly be defined as readily water swellable and dispersible, crosslinked, synthetic, organic, nitrogen-containing, polymeric polyelectrolytes.

The crosslinked products prepared according to the methods described above and illustrated in the examples below all exhibit very marked improvement in their behavior as fluocculating agents for solid particles suspended in aqueous media, being characterized by their ability to agglomerate the solids into massive flocs which settle very rapidly to leave in the main a wholly clarified supernatant liquor, or at worst, only a slight haziness. This is in contrast with the linear counterparts, which exhibit fine flocculating behavior inasmuch as the charges on the suspended particles are neutralized; however, the linear products do not serve to agglomerate the flocced particles except to a slight degree and as a consequence the the flocced particles settle slowly.

A careful study of this behavior of the crosslinked polycationic polyelectrolytes suggests an explanation for this desirable improvement in agglomerating (as distinct from flocculating) properties. It is well known to those skilled in the art that the mechanism whereby a polyelectrolyte serves to floc and agglomerate suspended colloidal particles is a two-fold one. First, an electrostatic attraction of the polymer to the colloidal particle with concomitant neutralization by the polyelectrolyte of charges on the surface of the colloid, charges which ordinarily prevent these particles from approaching each other, occurs. This action is referred to herein as flocculation. The second mode of action is a function of the geometry of the polyelectrolyte, e.g., the individual molecule of polyelectrolyte may be long enough to be attached to two or more particles at the same time and hold them together. This is referred to herein as agglomeration.

It is felt that the enhanced agglomerating ability of the crosslinked polyelectrolytes is due to their physical form, e.g., they may not disperse into solution as individual molecules, but rather swell and disperse into small networks which in certain extreme cases can be observed visually. These networks, of course, still carry the electrical charges which attract and hold them to the colloidal particles, but because of their size and form, they hold together numerous particles, build up to massive flocs and settle rapidly, sweeping the solution as they settle.

Under ordinary conditions these networks are stable for a long time, but extremely vigorous stirring with a powerful cutting agitator or homogenizing in a colloid mill can destroy these networks with a concomitant loss of some agglomerating properties. The higher the degree of crosslinking, the more stable are these networks toward dispersion. On the other hand, if the crosslinking is carried too far, the product cannot be dispersed and is therefore useless either as a flocculant or as an agglomerating agent. There is therefore an optimum degree of crosslinking for each material.

The existence of these networks, as they have been referred to, and their relationship to the amount of crosslinking present in a given system can be demonstrated in an interesting manner.

When a given crosslinked polyelectrolyte is allowed to swell and disperse in water with an occasional gentle agitation, the maximum agglomerating activity is reached after a certain interval of time which may be as long as three or four days. On long aging (several months) these solutions deposit a small amount of insoluble material and at the same time a gradual decrease in agglomerating activity is observable. The floccing activity is maintained, but the formation of coarse agglomerates is diminished. It is felt that this diminution in agglomerating activity is related to a gradual unwinding and disengagement of the networks above referred to.

A solution of such an active crosslink polyelectrolyte has a fairly high relative viscosity when it has reached optimum agglomerating activity. At this point the material is an active agglomerant for even very tiny slimes, primarily by virtue of the trapping action of the networks. If this highly active material is now passed through a colloid mill or homogenizer, many of these networks are destroyed, the relative viscosity of the solution drops markedly and, depending upon the stability of the networks, in turn related to the amounts of crosslinking, considerable agglomerating activity is lost. In fact, very fine slimes may completely escape agglomeration, as illustrated in certain examples below.

Induction will lead to the premise that a very high molecular weight polyelectrolyte may of its own accord yield networks of the sort under discussion, through the simple process of individual molecules becoming tangled up in each other. The stability of such networks would be extremely limited, however. In contrast a network arising out of crosslinking not only serves as a rather stable basic agglomerant but also serves to entangle individual linear molecules more effectively than another molecule of the same linear species. This has been deducted from observations on high molecular weight substantially linear polymers which, in early stages of dispersion, behave much like the crosslinked polyelectrolytes. However, they quickly lose much of the agglomerating activity as they disperse more completely and the meshes disengage. It is evident, therefore, that this network system exists to a certain extent even in a high molecular weight linear polymer dispersion, but that it is an extremely labile system which in a very short time loses the network characteristics. A crosslinked polyelectrolyte, on the other hand, affords a much more stable network system which remains so for periods of months. This type material I prefer to refer to as having a properly balanced filamentous network.

The ability of these crosslinked materials to agglomerate a highly dispersed but flocced (with an excess of linear flocculant) colloidal system as described above is therefore readily understood as a sweeping action by a filamentous network which traps the slime particles. Further, the failure of the crosslinked materials to behave as resuspending agents when used in large excess is understood in that the agglomerated material when brought into contact with excess reagent merely becomes more and more enmeshed, and the particle size simply grows.

Examples I through XII which follow illustrate the preparation of the agglomerating agents of the present invention:

*Example I*

To a 30% aqueous solution of vinyl pyrrolidone monomer which contained 0.3% ammonia, was added a quantity of N,N-diallyl acrylamide equal to 1% of the contained vinyl pyrrolidone. Hydrogen peroxide was added dropwise to a concentration of 0.15% based on total mixture and the solution was maintained at 40° C. until substantial gelling had occurred. The reaction was interrupted after five hours by diluting the mixture with water and dispersing it in a Waring Blendor after it had swelled for two days. It was thus diluted to 0.5% concentration.

*Example II*

11.1 grams of a high molecular weight polyvinyl pyrrolidone (K-90 viscosity) was dissolved in 100 ml. of concentrated HCl, sealed in a Pyrex tube and heated at 100° C. for 24 hours. After cooling the tube, it was opened. A sample of the discolored product was diluted to 0.5% concentration, but was no more effective than the starting material as a flocculant.

*Example III*

11.1 grams of polyvinyl pyrrolidone (K-90) was dissolved in 100 ml. of water and 4 grams of sodium hydroxide pellets was added. As the caustic dissolved, the polyelectrolyte precipitated out of solution. Stirring eventually effected re-solution of the mass. The mixture was heated in an open flask on a steam bath for four days during which it evaporated nearly to dryness a number of times and make-up water was added on occasion. The product had gelled to a large extent. It was swelled in water, blended in a Waring Blendor and diluted to 0.5% concentration. This blend was tested as a flocculant on a slime sample. It exhibited enhanced activity, giving rise to much larger flocced particles than the untreated polyvinyl pyrrolidone. The settling rate of said sample was enhanced and concomitant therewith its filterability was greatly improved. Thus, for example, when it was attempted to filter 10 ml. of a slimes sample on a small Hirsch funnel under vacuum, filtration was discontinued after thirty minutes when only a small fraction of the liquor had filtered. The addition of 1 ml. of the crosslinked polyvinyl pyrrolidone allowed filtration to dryness in 13 minutes. An equal amount of untreated polyvinyl pyrrolidone allowed filtration in 27 minutes.

*Example IV*

11.1 grams of polyvinyl pyrrolidone (K-90) was dissolved in water with 5 grams of NaOH and diluted to 135 ml. The mixture was heated to boiling, when essentially all of the polyvinyl pyrrolidone separated out as a second phase. Heating was continued for an hour. The product had gelled considerably. It was allowed to swell in the reaction mixture for two days, diluted, homogenized, and diluted to 0.5% concentration. The product had excellent agglomerating activity for slimes, but the activity slowly diminished over a period of a month to the point where it was no better than that of the unaltered polyvinyl pyrrolidone (K-90).

*Example V*

1.1 grams of polyvinyl pyrrolidone (K-90) was treated with 10 ml. of hot 40% NaOH. Solution did not really occur and the mixture was heated at water bath temperature for two hours, The product would not swell in water and could not be adequately dispersed.

*Example VI*

110 grams of polyvinyl pyrrolidone (K-90) was dissolved in 1300 ml. of water, and 200 ml. of a solution containing 40 grams of sodium hydroxide was slowly added. After the precipitated material had redissolved, the mixture was heated on a steam bath without stirring for 14 hours. A second phase had separated and the whole mixture was quite yellow. The mixture was cooled and the gel redispersed by swelling and stirring into the aqueous phase, and the mixture was then heated for an additional 45 minutes with frequent shaking. Much of the polyvinyl pyrrolidone settled out as gelatinous milky lumps. The mixture was cooled and the crosslinked polyvinyl pyrrolidone allowed to redisperse in the separated liquor. On dilution to 0.5% concentration it exhibited excellent flocculating and agglomerating activity and maintained the activity undiminished.

*Example VII*

It is well known in the art that low temperature polymerization of a monomer in solution (rather than bulk) leads essentially to a linear polymer. To this end 4 parts of purified acrylamide was dissolved in 40 parts deionized water and .005 part of potassium persulfate reagent was added. The air in the system was displaced with $CO_2$ and the container stoppered. The mixture was allowed to stand at room temperature for one week. A portion of the very thick solution was diluted to 0.5% concentration for testing.

*Example VIII*

Eleven parts of the concentrated solution obtained in Example VII (containing one part of linear polymer) was diluted with five parts of water. 0.13 part of formaldehyde (as 39% formalin) was added along with .005 part of solid ammonium chloride as a catalyst. The mixture was heated at 90–95° for thirty minutes during which it set to a semi-rigid gel. This gel was swelled in water for three days and dispersed by gentle stirring to an ultimate concentration of 0.5%.

*Example IX*

Eleven parts of the product of Example VII (containing one part linear polymer) was treated with 0.14 part formaldehyde (as 39% formalin) and .005 part $NH_4Cl$. In five minutes of heating at steam bath temperature, the material formed a very firm gel that would not swell and could not be redispersed.

*Example X*

Four parts of purified acrylamide was dissolved in nine parts distilled water and .005 part $K_2S_2O_8$ added. When the catalyst had dissolved, the air in the system was displaced with $CO_2$ and the mixture immersed in a bath at 60° C. Polymerization ensued rapidly and within three minutes a firm gel had formed. Bubbles formed within the gel as the heat of polymerization drove the temperature of the system to slightly above 100° C. These conditions were maintained for fifteen minutes, then the gel was cooled, cut into small wafers and immersed in water to swell. After three days, dispersion was completed by gentle stirring of the swelled polymer for several hours and final dilution to 0.5% concentration. After several months this solution deposited quantities of a white flocculent solid as part of the crosslinked material slowly came out of solution.

*Example XI*

Ten parts purified acrylamide was dissolved in twenty-four parts water and .01 part $K_2S_2O_8$ was added. The system was maintained in a $CO_2$ atmosphere until heating at 60° C. was begun by immersion in a bath, when the system was evacuated to 135 mm. (the equilibrium vapor pressure of water in this region). Gentle bubbling ensued in the thickening mixture and gelling occurred in about six minutes. After 17 minutes total heating the polymer was removed from the flask and weighed. Six parts of water had been lost by evaporation. The product was soaked in water for four days to swell and was ultimately dispersed to 0.5% concentration for testing.

*Example XII*

Very active flocculant-coagulant compositions may be prepared by limited crosslinking of acrylamide during polymerization with a water soluble diolefin. The following experimental data, in which all parts are by weight, illustrate the preparation of such compositions.

(A) One part of acrylamide and .0015 part N,N'-methylene bisacrylamide was dissolved in 13 parts of water, and then .005 part potassium persulfate was added to this solution. Nitrogen gas was bubbled through the solution, and the solution was heated at a temperature of 60–65° C. for a period of fifteen minutes, during which time a firm gel was produced. The product thus obtained swelled quite readily in water, was easily dispersed in water, and proved to be a very active flocculant-coagulant.

(B) One part of acrylamide and .0008 part N,N'-methylene bisacrylamide was dissolved in 13 parts of water. This solution was then polymerized at room temperature and in a carbon dioxide atmosphere using a typical redox catalyst (.005 part potassium persulfate and an equivalent amount on a molar basis of sodium thiosulfate). A soft gel formed in four hours, which could be readily dispersed in water to give a product which was very active as a flocculant and agglomerant.

(C) One part of acrylamide and .015 part of N,N'-methylene bisacrylamide was dissolved in 10 parts of water containing .005 part potassium persulfate. When this solution was heated to 60° C., it formed a hard gel which was not water-swellable or water dispersible.

(D) One part of acrylamide and .00003 part of N,N'-methylene bisacrylamide was dissolved in 10 parts of water containing .0005 part of potassium persulfate. This solution was heated under nitrogen at a temperature of 60° C. and for a period of 45 minutes. A firm gel was formed which was water-dispersible after lengthy swelling in water to give an excellent flocculant-coagulant.

It is apparent from the preparations illustrated in Example XII that a variety of monoolefin-diolefin-catalyst-solvent ratios may be employed to yield highly useful products. However, it is best to choose conditions and ratios yielding a soft to semi-rigid gel which is water-swellable and water-dispersible over a practical period of time.

PREPARATION OF SLIME SAMPLES

For testing samples for activity as flocculants, several slimes suspensions were prepared as follows:

(a) An ore ground to pass 10 mesh was leached with dilute sulfuric acid at 50% solids by agitating for four hours. The sands were allowed to settle for one minute. Then the slimes were decanted. The residual sands were repulped in four stages with enough dilute acid to afford, after settling and decantation of slimes, a volume of slimes equal to that obtained after the initial agitation and settling period. The pregnant liquor-slimes mixture contained 8% of solids as slimes.

(b) A portion of sample (a) slimes was treated with a dilute solution of guar gum to flocculate Type I slimes and the turbid supernatant liquor was decanted to afford a sample of Type II slimes at 0.5% solids. The latter was diluted with clarified liquor to 0.1% solids.

(c) A portion of sample (b) before dilution was treated with sufficient glue to achieve a slow settling of slimes to afford a thickened underflow at 6% solids. The underflow was kept for several days until the glue had hydrolyzed and lost its flocculating activity. The slimes were then used as sample (c).

Example XIII

For examining the agglomerating efficiency of various of the prepared samples, the following test was devised: two drops of slime solution (c) were placed in the well of a microscope slide, then a drop of the reagent being tested (0.5% concentration) was added. The drops were stirred together for ten seconds with a fine stirrer and the size of the agglomerated particles compared and rated visually from 1 to 5 as the size of the flocs increased. As standards were used a 147 jelly gram hide glue which gives very tiny flocs, rated 1; edible gelatin gives somewhat larger flocs rated 2; a crosslinked glue of intermediate activity (copending application Serial No. 421,161) rated 3, and a high activity crosslinked glue (copending application Serial No. 421,161) rated 4. Agglomerates larger than those yielded by the highly active crosslinked glue were rated 5.

The following table compares the ratings of the various products tested.

| Product used: | Rating |
|---|---|
| Polyvinyl pyrrolidone (K–90) (linear) | 2.0 |
| Example I | 3.5 |
| Example II | 1.5 |
| Example III | 4 |
| Example IV | 4 |
| Example V | 0 |
| Example VI | 5 |
| Example VII | <1 |
| Example VIII | 3.5 |
| Example IX | 0 |
| Example X | 5 |
| Example XI | 5 |

Thus, whereas linear polyvinyl pyrrolidone (K–90) had activity giving it a rating of 2.0 (essentially indistinguishable from gelatin) the product in which crosslinking was produced had an activity as high as 5 (e.g., Product VI). Linear polyacrylamide afforded almost *no* flocculation of these slimes, whereas the crosslinked products (except those crosslinked too far) showed marked agglomerating power. Surprisingly, linear polyacrylamide is a poorer flocculant for Type II slimes than is linear polyvinyl pyrrolidone, but appears to be superior to polyvinyl pyrrolidone as a flocculant for Type I slimes.

Example XIV

Ten ml. samples of slime fraction (b) at 0.1% solids were treated in graduates with two drops of the reagent to be tested (0.5% concentration), the graduates were inverted five times to allow mixing, and the time of settling of the flocs observed. The time required to obtain 4 ml. and 6 ml. of clear liquor respectively (40% and 60% settling) was noted. A visual observation as to the size of the flocs was made. The following tabulates the data obtained:

| Sample | Floc Size | Time (Seconds) to Obtain 4 ml. Clear Liquor | Time (Seconds) to Obtain 6 ml. Clear Liquor |
|---|---|---|---|
| Polyvinyl pyrrolidone (K–90) (linear).[1] | Small | 280 | 320 |
| Example I | Medium-Large | 78 | 99 |
| Example III | Large | 69 | 82 |
| Crosslinked glue [2] | do | 63 | 85 |
| Example VI | do | 60 | 90 |
| Example VII | No visible floccing | | |
| Example VIII | Large | 51 | 84 |
| Example X | do | 52 | 62 |
| Example XI | do | 31 | 47 |

[1] 4 drops.
[2] 4 drops of sample 58-3-10 of copending application Serial No. 421,161.

Here again the marked superiority of the crosslinked polyamides over their linear counterpart is observable, particularly in the instance of the linear polyacrylamide which exhibited practically no flocculating behavior with this sample of Type II slimes, whereas the crosslinked counterparts were very effective.

*Example XV*

In order to determine whether more partial hydrolysis of the polycrylamide during the more vigorous polymerization conditions or during the crosslinking with formaldehyde might have some effect upon the behavior toward the Type II slimes, a linear copolymer of acrylamide-maleic anhydride was prepared as follows: 3.75 parts of acrylamide and 0.25 part of maleic anhydride were dissolved in 38 parts water and 2 parts water containing .005 part $K_2S_2O_8$ was added. After several days the polymer was diluted to 0.5% concentration.

When two drops of this solution were added to 10 ml. of slimes (b), no visible flocculation occurred. It is therefore evident that the linear material whether homopolymer or copolymer does not form stable enough networks to sweep a suspension of this type, and that the inclusion of carboxyl groups alone into the system does not noticeably affect the behavior of the linear polymer toward these particular slimes. On the other hand, crosslinking of the polymer is effective.

*Example XVI*

The specific viscosity of various polymer solutions at 0.5% concentration was determined by the capillary flow method at 34° C. The sample was then passed through a hand homogenizer and the specific viscosity again determined.

| Sample | Unhomogenized | | Homogenized | | Change in specific viscosity with homogenization $\Delta\eta$ sp. |
|---|---|---|---|---|---|
|  | Flow Time Sec. | Specific Viscosity | Flow Time Sec. | Specific Viscosity |  |
| Water | 24.9 |  |  |  |  |
| Ex. VII | 35.0 | 0.405 | 32.2 | 0.293 | .112 |
| Ex. X | 42.0 | 0.685 | 33 | 0.325 | .360 |
| Ex. XI | 44.2 | 0.772 | 31.8 | 0.278 | .494 |
| Ex. XV | 33.1 | 0.330 | 30.5 | 0.224 | .106 |

It is therefore apparent that the desirable crosslinked polyacrylamide polymers have a specific viscosity at 34° C. in 0.5% solution in excess of about 0.50 and that the larger the change in specific viscosity upon homogenizing, preferably at least 0.25, the greater is the agglomerating activity of the polymer (before homogenizing). This conclusion is derivable by correlating the settling data of Example XIV with the $\Delta\eta_{sp}$. of Example XVI.

The effect of homogenizing upon the agglomeration of slimes (b) by these polymers is drastic. Thus, none of the homogenized products except product XI produced visible flocculation in these slimes and no settling at all had occurred in 5 minutes. Product XI produced small flocs which settled slowly.

It is therefore apparent that crosslinking in these polymers produces stabilized microscopic networks which function to agglomerate the slimes and which can be destroyed by homogenizing. It is further evident that the higher the initial specific viscosity, the more stable are these networks.

*Example XVII*

Twenty-five ml. samples of slimes (a) were treated with similar quantities of various reagents (0.5% concentration) and the height of slime bed observed as a function of time.

[Height of slime bed (ml.)]

| Time (Sec.) | Polyvinyl pyrrolidone (K-90) | Product of Example I | Product of Example VI |
|---|---|---|---|
| 30 | 26 | 25 | 25 |
| 60 | 26 | 24.5 | 24.5 |
| 180 | 26 | 23 | 22.2 |
| 360 | 25.5 | 19.5 | 17.5 |
| 540 | 24.8 | 17.5 | 16.0 |
| 600 | 24.3 | 16.5 | 15.5 |
| 1,320 | 21.5 | 13.5 | 13 |

*Example XVIII*

100 ml. of slimes (a) were treated with 2 ml. guar gum and 8 drops carboxymethyl cellulose (CMC) and the slimes agitated. Then 2 ml. of an additional reagent (all reagents were of 0.5% concentration except for carboxymethyl cellulose which was 0.2% concentration) were added, the slimes reagitated and settling times observed.

[Height of slime bed (ml.)—Additional reagent]

| Time Sec. | 2 ml. guar+ 0.4 ml. CMC | PVP [1] | Product of Example I | Product of Example IV | Product of Example VI |
|---|---|---|---|---|---|
| 30 | 94 | 104 | 96 | 92 | 76 |
| 60 | 72 | 100 | 86 | 78 | 62 |
| 120 |  | 96 | 64 | 60 | 52 |
| 180 | 48 | 94 | 56.8 | 54 | 48 |
| Appearance of Supernatant Liquor | ([2]) | ([3]) | ([3]) | ([3]) | ([3]) |

[1] PVP designates a K-90 linear polyvinyl pyrrolidone.
[2] Turdid.
[3] Clear.

Thus it is seen that the linear polycationic flocculant, polyvinyl pyrrolidone, superimposes its own poor settling characteristics on the settling behavior of guar-flocculated material. The effect with the cross linked polyelectrolyte, on the other hand, is an enhancing of settling rate to approximately that produced by guar flocculation alone, coupled with the production of a clear overflow. The synergistic response of crosslinked polycationics with guar and carboxymethyl cellulose is therefore very clear.

When, after final settling, the supernatant liquor from the flocculation was decanted and the settled slimes were resuspended in water for washing, considerable fining and resuspension occurred in the sample flocced with guar and carboxymethyl cellulose alone, so that a turbid overflow resulted. This turbidity was not flocced by the addition of more guar-carboxymethyl cellulose. However, the addition of small quantities of the product of Example IV clarified this solution. Repulping of slimes treated with the combination of reagents (above) afforded a minimum of fining, and clear supernatant liquor. Settling was slowest in the sample treated with unmodified polyvinyl pyrrolidone, and fastest in the other three instances.

*Example XIX*

In order to compare the rate of settling of primary slimes flocced with linear and with crosslinked polyacrylamides, 100 ml. samples of slimes (a) were treated with equal quantities of these reagents and the rate of fall of slimes determined.

[Slime height (ml.)—sample]

| Time Sec. | Product of Example VII | Product of Example X | Product of Example XI |
|---|---|---|---|
| 30 | 91 | 67 | 61 |
| 60 | 72 | 49 | 46 |
| 90 | 60 | 41 | |
| 120 | 52 | | |
| Supernatant | (1) | (2) | (2) |

[1] Very Turbid.
[2] Slight Turbidity.

Homogenizing of the active samples afforded products whose activity closely resembled that of linear Product VII and which afforded liquors more turbid than before homogenizing.

*Example XX*

In order to obtain wholly clairfied liquors from primary slimes it is often essential to employ a combination of reagents. Thus, it has been observed that inexpensive hide glue, methocel and other reagents in combination with the polyamides will often afford liquor of higher clarity than the polyamide itself. The settling rate with crosslinked polyamides is but little affected, whereas with the linear material, marked decrease in settling rate results. Thus 100 ml. samples of slime (a) were treated with similar quantities of a combination of polyamide and glue or polyamide and high viscosity methocel, and the rate of fall of the flocced slimes observed.

[Sample (slime height)]

| Time Sec. | Product of Example VII +Glue | Product of Example X +Glue | Product of Example X [1] +Glue | Product of Example VII +Methocel | Product of Example XI +Methocel |
|---|---|---|---|---|---|
| 30 | | 81 | | | 78 |
| 60 | 100.5 | 65 | 95 | 99.5 | 62 |
| 90 | | 56 | | | 52 |
| 120 | 100.1 | | 71 | 99 | |
| 180 | 100 | | | 98 | |
| 300 | 99 | | | | |
| 420 | 98.2 | | | | |
| Liquor | (2) | (2) | (3) | (2) | (2) |

[1] Homogenized.
[2] Clear.
[3] Slight Turbidity.

It is therefore apparent that glue and methocel superimpose their slow settling characteristics upon the linear polyacrylamide but not upon the crosslinked product. Homogenizing of Product X effected a decrease in the settling rate and surprisingly affected the clarity of liquor also.

Where a plurality of reagents are used, i.e., a flocculating agent such as glue, gelatin, carboxymethyl cellulose, hydroxyethyl cellulose, methyl cellulose, hydroxyethyl carboxymethyl cellulose, guar gum, locust bean gum, or other suitable flocculating reagent, in combination with the crosslinked products of the invention, it is preferable in many instances to add the crosslinked products of the invention after a substantial amount of flocculation of the suspended solids is achieved by the particular reagent or reagents to be used in combination therewith. For example, if the plurality of reagents comprises a water soluble protein such as glue or gelatin in combination with the crosslinked products of the invention, better results are usually obtained by first adding the glue or gelatin until there is substantial flocculation of the suspended solids, and then adding the crosslinked products of the invention to complete agglomeration of the suspended solids. The ratio of co-flocculant to the crosslinked product of the invention may range from substantially equivalent amounts to 20 times as much, with the preferred ratio usually varying between 1:4 to 1:14.

The crosslinked products of the invention do not exhibit properties of detergents and thus resuspension of hydrometallurgical slimes does not occur unless the amount used is excessive beyond all practical limits. The quantity of treating agent necessary to effectively flocculate and agglomerate a particular slime appears to be dependent upon the amount of solids suspended in the slime and their type. A practical and effective range when using the crosslinked product of the invention alone is 0.02–3.0 lb. of crosslinked product per ton of suspended solids. In addition, the treating agent of the invention, as illustrated in the examples, should be added to the aqueous medium containing suspended solids to be treated as a dilute dispersion of the cross-linked product of the invention and preferably as a dilute aqueous dispersion. The concentration of the cross-linked product of the invention in the dilute dispersion preferably should be about 0.5% by weight or less in most instances.

The term "protein class" as used in the specification and claims is intended to include organic nitrogenous colloidal substances such as glue, both animal and vegetable, gelatin, water-soluble extracts from collagen-like materials and similar suitable substances for the purpose of the invention.

The term "polysaccharide" as used in the specification and claims is intended to include substances such as certain starch fractions; the modified celluloses such as carboxymethyl cellulose, hydroxyethyl cellulose, methyl cellulose, hydroxyethyl carboxymethyl cellulose; certain naturally occurring gums such as locust bean gum and guar gum; and similar suitable substances for the purpose of the invention.

The foregoing examples illustrate data obtained by testing the crosslinked products of the invention on slimes suspended in acidic aqueous media. Experience has shown such products to be most effective in acidic aqueous media, but their activity is largely maintained in neutral aqueous media. However, in moderately to strongly alkaline aqueous media, i.e., at a pH above about 8, their activity diminishes to the point of ineffectiveness in most instances. The unusual and unexpected results obtained by treating slimes having a relatively low pH, i.e., below 2, with the crosslinked product of the invention is thought to be due to the coordination of a proton on the amide nitrogen, viz.

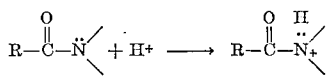

The objects of this invention as outlined in the preceding disclosure have therefore been achieved by the stabilization through crosslinking of an otherwise very labile network system, the result being the flocculation of slimes through electrolytic attraction followed by massive agglomeration through the agency of the above described networks resulting in the rapid settling or enhanced filterability of the system of suspended solids.

I claim:

1. An improved process for flocculating and settling solids suspended in an aqueous medium comprising treating the suspension of solids with a flocculating agent comprising a dilute dispension of a water swellable and water dispersible polyacrylamide, said polyacrylamide being a copolymerization product of acrylamide and not more than one percent by weight of the copolymerization product of a water soluble diolefin, and allowing the flocculated solids to settle.

2. An improved process for flocculating and settling solids suspended in an aqueous medium comprising treating the suspension of solids with a flocculating agent comprising a dilute dispersion of a water swellable, water dispersible polyacrylamide, said polyacrylamide being a copolymerization product of acrylamide and not more than one percent by weight of the copolymerization product of N,N'-methylene bisacrylamide, and allowing the flocculated solids to settle.

3. A process for flocculating solids suspended in an aqueous medium comprising treating the said suspension of solids with a dilute aqueous dispersion of at least one flocculating agent selected from the group consisting of:

(a) Water swellable and dispersible crosslinked polyacrylamide prepared by reacting substances consisting essentially of polyacrylamide and a water soluble aldehyde in aqueous solution and terminating the reaction before the resulting crosslinked polyacrylamide recation product becomes water inswellable and indispersible, (b) Water swellable and dispersible copolymers of acrylamide and at least one ethylenically unsaturated comonomer containing a plurality of ethylenic linkages, the copolymer being the copolymerization product of a monomeric mixture consisting essentially of acrylamide monomer and not more than about 1% by weight of the ethylenically unsaturated comonomer, (c) Water swellable and dispersible copolymers of N-vinyl pyrrolidone and at least one ethylenically unsaturated comonomer containing a plurality of ethylenic linkages, the copolymer being the copolymerization product of a monomeric mixture consisting essentially of N-vinyl-pyrrolidone and not more than about 1% by weight of the ethylenically unsaturated comonomer, and (d) Water swellable and dispersible condensation products of poly-N-vinyl pyrrolidone prepared by heating an aqueous mixture consisting essentially of poly-N-vinyl pyrrolidone and alkali.

4. The process of claim 3 wherein the flocculating agent comprises a water swellable and dispersible crosslinked polyacrylamide prepared by reacting substances consisting essentially of polyacrylamide and a water soluble aldehyde in aqueous solution and terminating the reaction before the resulting crosslinked polyacrylamide reaction product becomes water inswellable and indispersible.

5. The process of claim 3 wherein the flocculating agent comprises a water swellable and dispersible crosslinked polyacrylamide prepared by reacting substances consisting essentially of polyacrylamide and a water suble aldehyde selected from the group consisting of formaldehyde, glyoxal and pyruvic aldehydes in aqueous solution and terminating the reaction before the resulting crosslinked polyacrylamide reaction product becomes water inswellable and indispersible.

6. The process of claim 3 wherein the flocculating agent comprises water swellable and dispersible crosslinked polyacrylamide prepared by reacting substances consisting essentially of polyacrylamide and formaldehyde in aqueous solution and terminating the reaction before the resulting crosslinked polyacrylamide reaction product becomes water inswellable and indispersible.

7. The process of claim 3 wherein the flocculating agent comprises a copolymer of acrylamide and at least one ethylenically unsaturated comonomer containing a plurality of ethylenic linkages, the copolymer being the copolymerization product of a monomeric mixture consisting essentially of acrylamide monomer and not more than about 1% by weight of the said ethylenically unsaturated comonomer.

8. The process of claim 3 wherein the flocculating agent comprises a copolymer of N-vinyl pyrrolidone and at least one ethylenically unsaturated comonomer selected from the group consisting of diallylacrylamide, N,N'-methylene bisacrylamide and water soluble diolefins, the copolymer being the copolymerization product of a monomeric mixture consisting essentially of N-vinyl pyrrolidone and not more than about 1% by weight of the said ethylenically unsaturated comonomer.

9. The process of claim 3 wherein the flocculating agent comprises a copolymer of N-vinyl pyrrolidone and N,N'-methylene bisacrylamide, the copolymer being the copolymerization product of a monomeric mixture consisting essentially of N-vinyl pyrrolidone and not more than about 0.15% by weight of N,N'-methylene bisacrylamide.

10. The process of claim 3 wherein the flocculating agent comprises a water swellable and dispersible condensation product of poly-N-vinyl pyrrolidone prepared by heating an aqueous mixture consisting essentially of poly-N-vinyl pyrrolidone and alkali.

11. The process of claim 3 wherein the flocculating agent is a water swellable and water dispersible copolymer of N-vinyl pyrrolidone and diallylacrylamide, the copolymer being the copolymerization product of a monomeric mixture consisting essentially of N-vinyl pyrrolidone and a minor amount of diallylacrylamide.

12. The process of claim 3 wherein the suspension of solids in the aqueous medium is also treated with a water soluble protein flocculant.

13. The process of claim 3 wherein the suspension of solids in the aqueous medium is also treated with a polysaccharide flocculant.

14. The process of claim 3 wherein the treatment of the suspended solids with the said flocculating agent is preceded by treatment with a water soluble protein flocculant selected from the group consisting of glue and gelatin.

15. The process of claim 3 wherein the treatment of the suspended solids with the said flocculating agent is preceded by treatment with a polysaccharide flocculant selected from the group consisting of carboxymethyl cellulose, hydroxyethyl cellulose, methyl cellulose, hydroxyethyl carboxymethyl cellulose, locust bean gum and guar gum.

16. A water swellable and dispersible crosslinked polyacrylamide prepared by reacting substances consisting essentially of polyacrylamide and a water soluble aldehyde in aqueous solution and terminating the reaction before the resulting crosslinked polyacrylamide reaction product becomes water inswellable and indispersible.

17. A water swellable and dispersible crosslinked polyacrylamide prepared by reacting substances consisting essentially of polyacrylamide and a water soluble aldehyde selected from the group consisting of formaldehyde, glyoxal and pyruvic aldehydes in aqueous solution and terminating the reaction before the resulting crosslinked polyacrylamide reaction product becomes water inswellable and indispersible.

18. A water swellable and dispersible crosslinked polyacrylamide prepared by reacting substances consisting essentially of polyacrylamide and formaldehyde in aqueous solution and terminating the reaction before the resulting crosslinked polycrylamide reaction product becomes water inswellable and indispersible.

19. A process for flocculating and settling solids suspended in an aqueous medium comprising treating the said suspension of solids with an aqueous dispersion of a flocculating agent comprising a copolymer of acrylamide and at least one ethylenically unsaturated comonomer selected from the group consisting of diallylacrylamide, N,N'-methylene disacrylamide and water soluble diolefins, the copolymer, being the copolymerization product of a monomeric mixture consisting essentially of acrylamide monomer and not more than about one percent by weight of the said ethylenically unsaturated comonomer, and allowing the flocculated solids to settle.

20. A process for flocculating and settling solids suspended in an aqueous medium comprising treating the said suspension of solids with an aqueous dispersion of a flocculating agent comprising a copolymer of acrylamide and N,N'-methylene bisacrylamide, the copolymer being the copolymerization product of a monomeric mixture consisting essentially of acrylamide monomer and not more than about 0.15 percent by weight of N,N'-methylene bisacrylamide, and allowing the flocculated solids to settle.

References Cited by the Examiner
UNITED STATES PATENTS

| | | |
|---|---|---|
| 2,173,005 | 9/1939 | Strain. |
| 2,486,190 | 10/1949 | Minsk et al. _____ 260—89.7 |
| 2,634,259 | 4/1953 | Ney et al. |
| 2,658,045 | 11/1953 | Schildknecht. |
| 2,665,271 | 1/1954 | Beller. |
| 2,685,369 | 8/1954 | Crossley _____ 210—54 X |
| 2,688,550 | 9/1954 | McFarlane. |
| 2,728,725 | 12/1955 | Gloor _____ 210—54 X |
| 2,795,545 | 6/1957 | Gluesenkamp. |
| 2,810,716 | 10/1957 | Markus _____ 260—88.1 |
| 2,854,407 | 9/1958 | Mallory. |
| 2,923,692 | 2/1960 | Ackerman et al. _____ 260—17.4 |
| 2,981,630 | 4/1961 | Rowland _____ 210—54 X |

MORRIS O. WOLK, *Primary Examiner.*

UNITED STATES PATENT OFFICE
CERTIFICATE OF CORRECTION

Patent No. 3,235,490                      February 15, 1965

Mayer B. Goren

It is hereby certified that error appears in the above numbered patent requiring correction and that the said Letters Patent should read as corrected below.

Column 5, line 51, for "aconitrate" read -- aconitate --; column 6, line 55, for "alkyline" read -- alkaline --; column 7, line 18, for "dispensible" read -- dispersible --; line 38, strike out "the", second occurrence; column 8, line 20, for "crosslink" read -- crosslinked --; column 13, line 8, for "more" read -- mere --; column 15, line 28, for "clairfied" read -- clarified --; column 17, line 66, for "uble" read -- soluble --; column 19, line 7, for "disacrylamide" read -- bisacrylamide --; line 8, after "copolymer" strike out the comma.

(SEAL)         Signed and sealed this 7th day of February 1967.

Attest:

ERNEST W. SWIDER                                EDWARD J. BRENNER
Attesting Officer                                         Commissioner of Patents